(12) United States Patent
Tierney et al.

(10) Patent No.: US 7,479,981 B2
(45) Date of Patent: Jan. 20, 2009

(54) TESTING A VERTICAL BLANKING INTERVAL SIGNAL

(75) Inventors: Percy A Tierney, Seattle, WA (US); Tuan D Le, Redmond, WA (US); Anand Ganesh, Redmond, WA (US); Adrian Mircea Sima, Pitesti (RO)

(73) Assignee: Microsoft Corporation, Redmond, WA (US)

( * ) Notice: Subject to any disclaimer, the term of this patent is extended or adjusted under 35 U.S.C. 154(b) by 443 days.

(21) Appl. No.: 11/157,358

(22) Filed: Jun. 20, 2005

(65) Prior Publication Data

US 2006/0284980 A1    Dec. 21, 2006

(51) Int. Cl.
*H04N 17/00* (2006.01)
(52) U.S. Cl. .................. 348/184; 348/194
(58) Field of Classification Search ......... 348/183–185, 348/194, 529; 345/440.1; 324/88; 702/67–74
See application file for complete search history.

(56) References Cited

U.S. PATENT DOCUMENTS

| 3,567,862 | A | * | 3/1971 | Carnt et al. | 348/184 |
|---|---|---|---|---|---|
| 3,825,835 | A | * | 7/1974 | Hammett et al. | 455/226.3 |
| 4,092,666 | A | * | 5/1978 | Rhodes et al. | 348/184 |
| 4,384,306 | A | * | 5/1983 | Liu | 348/606 |
| 4,417,268 | A | * | 11/1983 | LaSota | 348/184 |
| 4,437,120 | A | * | 3/1984 | Farmer et al. | 348/189 |
| 4,684,988 | A | * | 8/1987 | Johannes | 348/529 |
| 5,027,058 | A | * | 6/1991 | Kleck et al. | 324/121 R |
| 5,172,216 | A | * | 12/1992 | Suzuki et al. | 348/185 |
| 5,249,050 | A | * | 9/1993 | Zato | 348/478 |
| 5,734,422 | A | * | 3/1998 | Maurer et al. | 348/184 |
| 5,914,719 | A | | 6/1999 | Herz | |
| 6,072,532 | A | | 6/2000 | Chieh et al. | |
| 6,219,030 | B1 | * | 4/2001 | Nonomura et al. | 345/603 |
| 6,275,257 | B1 | * | 8/2001 | Tallman et al. | 348/184 |
| 2002/0140817 | A1 | * | 10/2002 | Biagiotti et al. | 348/180 |
| 2004/0233289 | A1 | * | 11/2004 | Imamura | 348/184 |

OTHER PUBLICATIONS

"VBI Scope" Nomad Electronics, Apr. 11, 2005.

* cited by examiner

*Primary Examiner*—Victor R Kostak

(57) ABSTRACT

A vertical blanking interval (VBI) signal testing tool captures, isolates, and analyzes a VBI signal to determine the quality of the VBI signal or signal source. A digitized VBI signal is received and analyzed according to industry standards. The VBI signal is first examined using thresholds, threshold points, and other points as a way of discerning waveforms in the signal and their individual characteristics. Thereafter, deviations of the VBI signal from industry standards are logged or displayed for review.

24 Claims, 7 Drawing Sheets

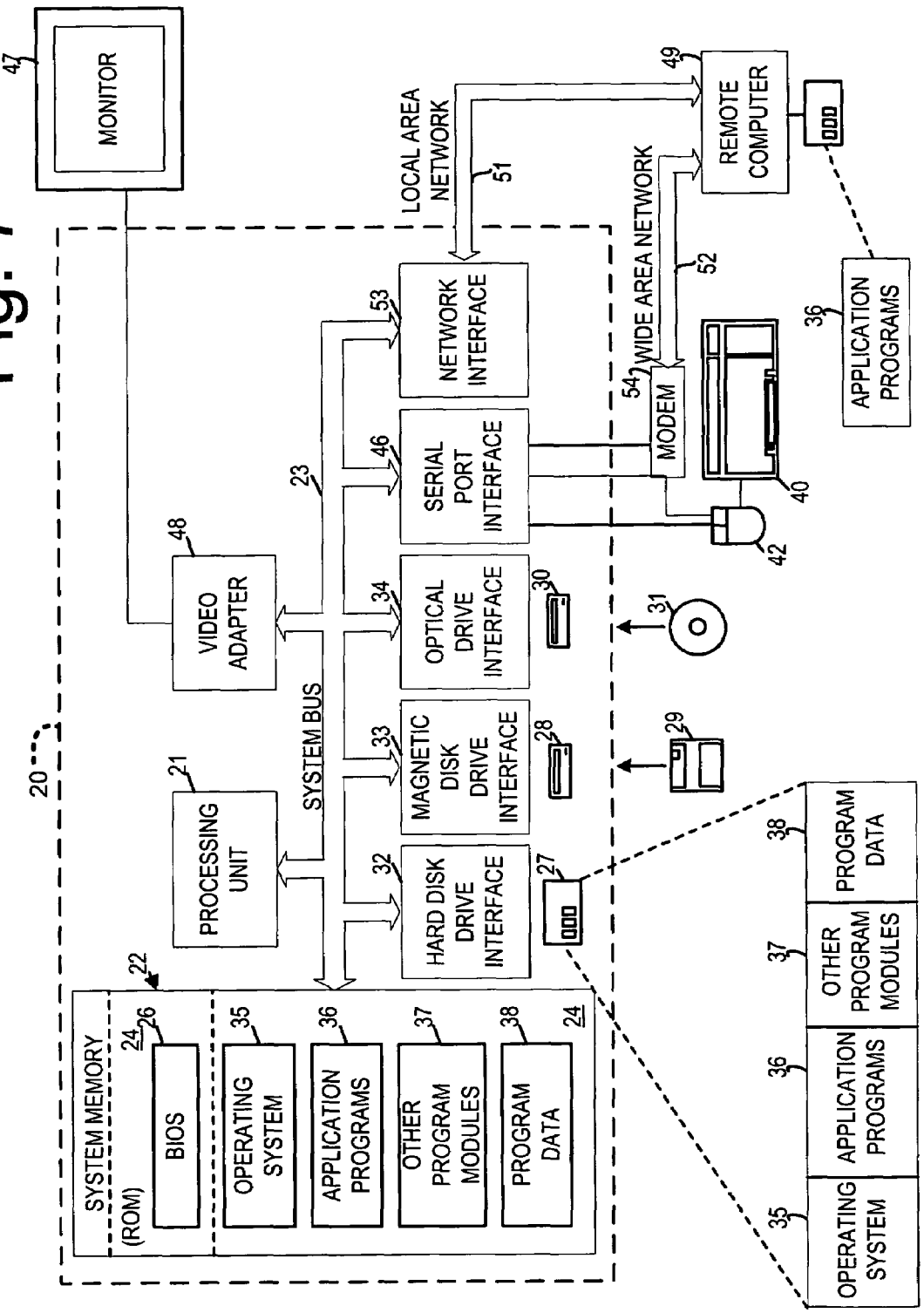

TESTING A VERTICAL BLANKING INTERVAL SIGNAL

TECHNICAL FIELD

The invention relates generally to video technology, and more particularly to testing a vertical blanking interval signal.

BACKGROUND

Modern broadcast television (TV) signals for Standard Definition Television (SDTV) generally support three major types of television broadcast standards throughout the world, namely NTSC, PAL, and SECAM. A modern broadcast television signal is received by a television tuner as a sequence of video frames, wherein each video frame includes a series of horizontal scan lines. The television receivers in use when the SDTV standards were developed used an electron beam aimed by a magnet to write each scan line to the screen. In that context, when a broadcast television signal was received by such a television receiver, each horizontal line of video was written sequentially to the screen, one at a time, starting with the first or top horizontal line. When the beam reached the end of the last horizontal line at the bottom of the screen, the beam was turned off in order to allow it to return to the beginning of the next frame (i.e., at the first or top horizontal line again).

A vertical blanking interval (VBI) in an SDTV signal refers to the short period of time during which the beam was turned off and no video would be sent to the television receiver. It was realized that other non-video data could be sent during the VBI period, as long as the television receivers were set up to recognize the data. Accordingly, several types of data (i.e., VBI data) have been transmitted during the VBI period, including Closed Captioning (CC) data, (based on the EIA/CEA-608-B specification), program ratings, and Teletext (based on the BT.653 specification).

However, the advent of television reception on computers has been a challenge in the computer industry. First, processing and displaying high quality video in a computer was a significant obstacle, which has now been adequately resolved. Then, providing high quality audio in synchronization with the video was also an obstacle but it too has been adequately resolved. However, aberrations in VBI signals remain a challenge for ensuring high quality VBI signals (and therefore high quality VBI data). For example, the state of the art requires manual observation of VBI signals on an oscilloscope—an unsatisfactory approach.

SUMMARY

Implementations described and claimed herein address the foregoing problems by providing a tool for capturing, isolating, and analyzing a VBI signal to determine the quality of the VBI signal or signal source. A digitized VBI signal is received and analyzed according to industry standards, such as the EIA/CEA-608-B specification for NTSC Closed Captioning and the BT.653 specification for TeleText. The VBI signal is first examined using thresholds, threshold points, and other points as a way of discerning waveforms in the signal and their individual characteristics. Thereafter, deviations of the VBI signal from industry standards are logged or displayed for review.

In some implementations, articles of manufacture are provided as computer program products. One implementation of a computer program product provides a computer program storage medium readable by a computer system and encoding a computer program. Another implementation of a computer program product may be provided in a computer data signal embodied in a carrier wave by a computing system and encoding the computer program.

Other implementations are also described and recited herein.

BRIEF DESCRIPTIONS OF THE DRAWINGS

FIG. 7 illustrates a system that may be useful in implementing the described technology.

DETAILED DESCRIPTIONS

Figure 1:
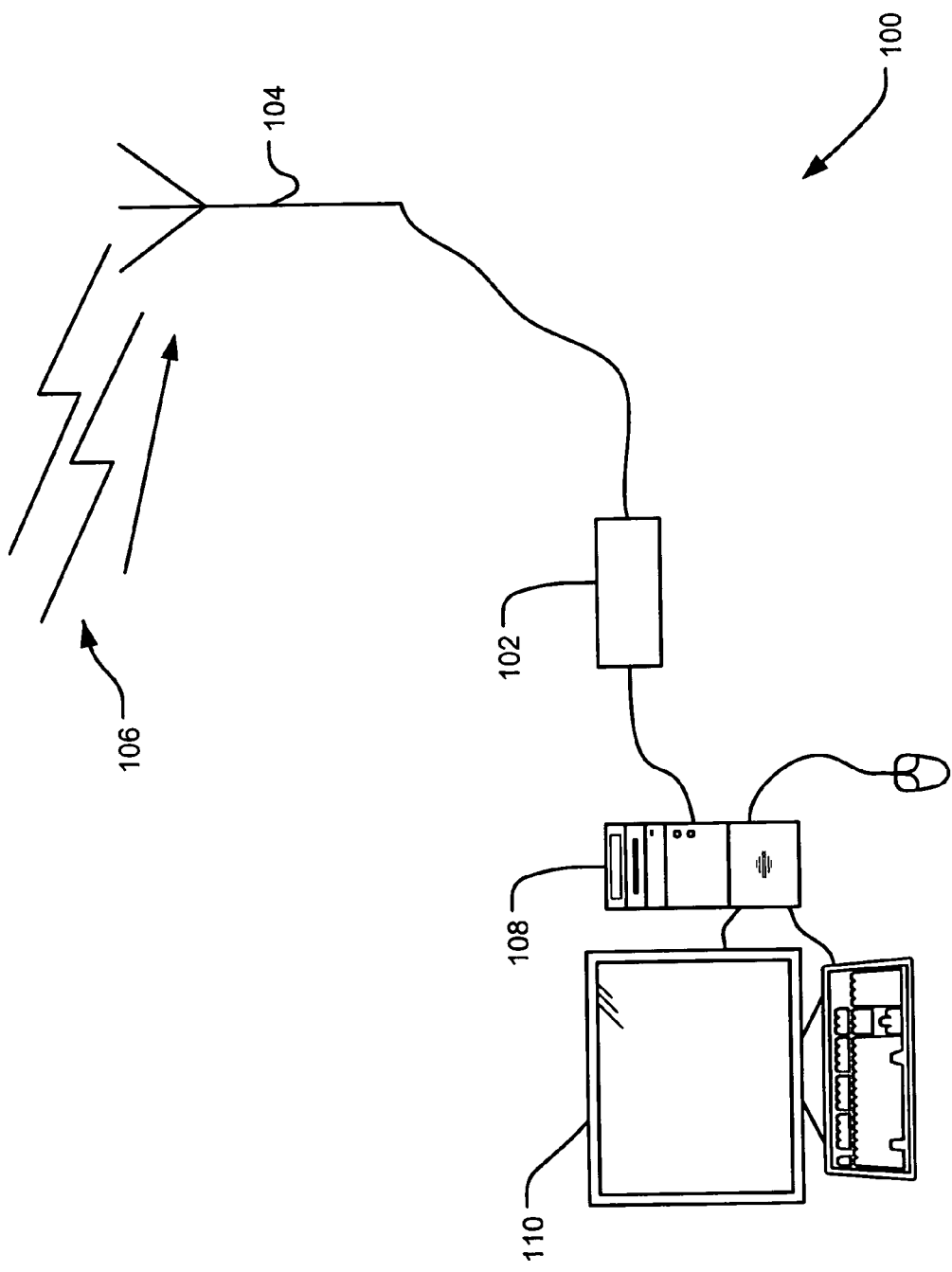
FIG. 1 illustrates an exemplary configuration for capturing and analyzing a VBI signal.

FIG. 1 illustrates an exemplary configuration 100 for capturing and analyzing a VBI signal. An exemplary TV tuner 102 is coupled to an antenna 104 that receives broadcast TV signals 106, typically through a coaxial cable. Alternatively, the broadcast TV signal 106 can be received through a cable TV output or other broadcast TV source. Generally, the broadcast TV signal 106 includes a video portion, an audio portion, and a VBI portion. The TV tuner 102 is also coupled to a computer system 108, which can execute a VBI signal testing program to capture and analyze VBI signals. Input VBI signals and results of the program's analysis can be stored locally, communicated via a network or removable medium, or displayed on a monitor 110 or printer (not shown).

The TV tuner 102 may be described as having four primary functional components:

Broadcast TV signal input—The TV Tuner has at least one input connector that can be plugged into a television signal source. Typical connectors may include without limitation coaxial cable (which can be plugged into a cable TV output or a stand alone antenna), an S-Video cable, and RCA inputs (which may be plugged into a VCR or other multimedia source).

Tuner—The tuner module receives the broadcast TV signal at a frequency designated for a specified channel.

Analog to digital converter (ADC)—The ADC receives the analog broadcast TV signal from the tuner and converts it into 3 digital data streams: audio, video, and VBI.

Computer I/O interface—The TV tuner 102 may be externally connected to the computer 108 via an I/O port (e.g., 1394 or USB), as shown, or may be internally installed within the computer chassis (e.g., connected to a PCI/AGP). TV signal data may be communicated from the TV tuner 102 to the computer 108, and control commands may be communicated from the computer to the TV tuner 102. Other connection options are also contemplated, including networked connections, wireless connections, etc.

The TV tuner 102 digitizes the broadcast TV signal received through the antenna 104 and separates the video portion, the audio portion and the VBI portion into separate digital streams that can be received by the computer 108. The TV signals are delivered as a sequence of frames consisting of a series of horizontal scan lines displayed from top to bottom. After the series of scan lines are displayed for a given frame, a vertical blanking interval is encountered, during which the display is disabled and the VBI signal is received. After the VBI, the horizontal scan lines resume for the next frame, starting at the top of the display. The TV tuner provides one VBI data packet (containing digitized data representing the VBI signal) for each frame displayed. Each VBI data packet generally includes multiple lines of VBI signal. NTCS is transmitted at a frame rate of approximately 60 fields per second, and therefore provides 60 VBI data packets per second. PAL is transmitted at 50 fields per second, and therefore provides 50 VBI data packets per second.

In one implementation, a VBI data packet includes a header describing the VBI payload in the packet, followed by the VBI payload. The header is a documented structure called the "KS_VBIINFOHEADER". This structure details the video standard (e.g., NTSC, PAL, SECAM and their variants), the scan lines of a frame in which VBI data is provided, the size of a packet, etc. An example of data in a KS_VBIINFO-HEADER structure is given below.

TABLE 1

KS_VBIINFOHEADER Example

| Field: Data Value | Description |
|---|---|
| StartLine: 10 | Specifies the line number of the first digitized VBI line. |
| EndLine: 21 | Specifies the line number of the last digitized VBI line. |
| SamplingFrequency in hertz: 28636360 | Specifies the sampling frequency in hertz (Hz). |
| MinLineStartTime: 737 | Specifies the shortest possible interval from the leading edge of H-sync in 10-nanosecond units |
| MaxLineStartTime: 737 | Specifies the longest possible interval from the leading edge of H-sync in 10-nanosecond units |
| ActualLineStartTime: 737 | Specifies the actual starting point of VBI digitization from the leading edge of H-sync in 10-nanosecond units |
| ActualLineEndTime: 6101 | Specifies the actual ending point for VBI digitization from the leading edge of H-sync in 10-nanosecond units |
| VideoStandard: 1 | Code for TV type (NTSC, PAL, SECAM) |
| SamplesPerLine: 1536 | Specifies the number of samples digitized per video line. |
| StrideInBytes: 1536 | Specifies the stride in bytes between the first sample on a given line and the first sample on the next line. This value can be larger than SamplesPerLine. |
| BufferSize: 18432 | Specifies the size in bytes of the buffer to store the entire digitized VBI signal. |

The VBI payload resides in the payload buffer and can be in one of a variety of formats, all of which generally include a plurality of digitized data samples, each sample containing one byte of data. The VBI signal also relates to a plurality of lines in the frame. For example, the VBI signal described in Table 1 starts with line 10 and ends with line 21 for a total of 12 lines of data.

Figure 2:
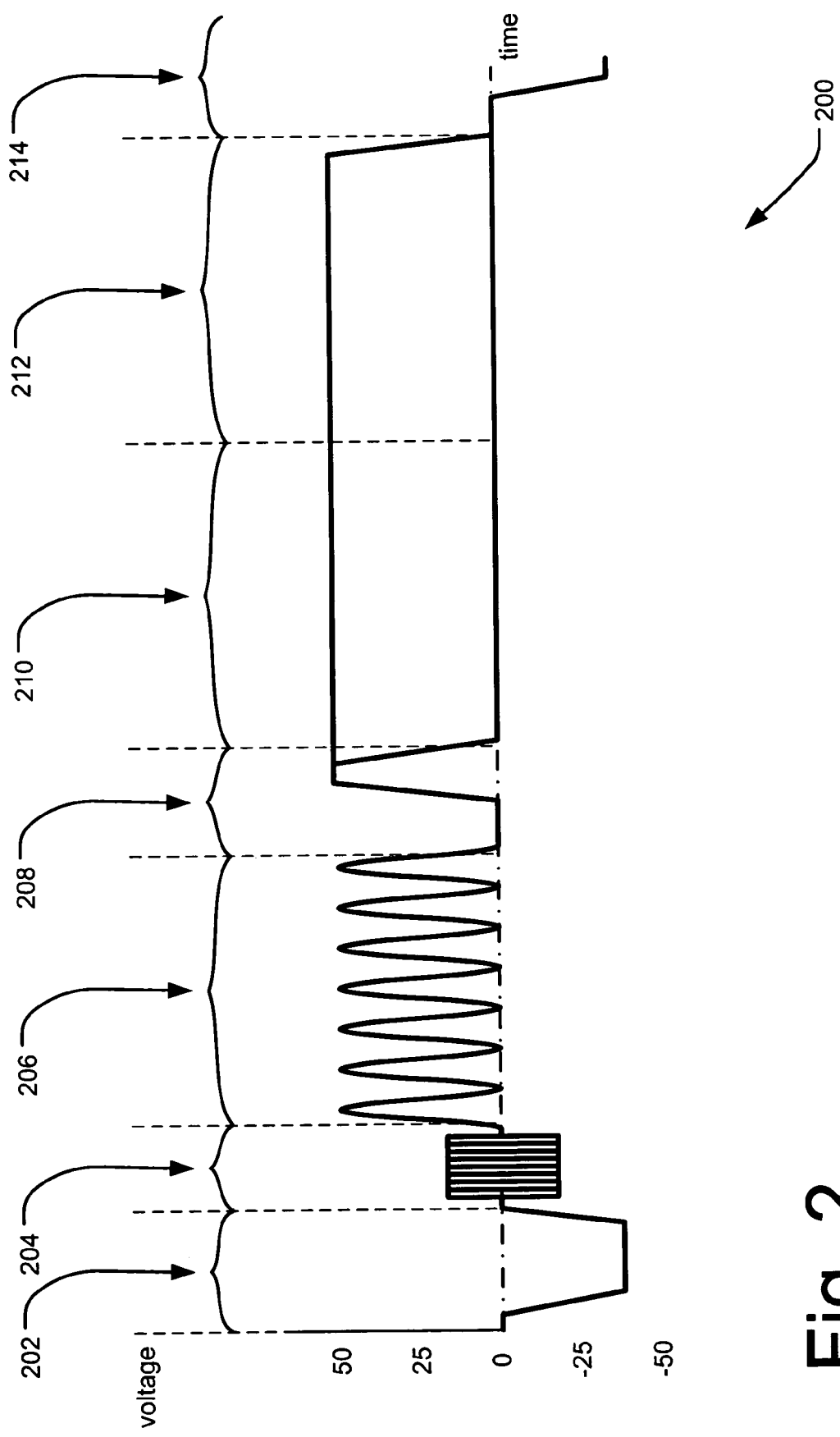
FIG. 2 illustrates an exemplary VBI signal captured by a VBI signal testing program.

FIG. 2 illustrates an exemplary VBI signal 200 captured by a VBI signal testing program. Each digitized data sample of the VBI payload represents a data point in the displayed VBI signal 200. A VBI signal line portion of the displayed signal begins after a horizontal sync 202 and a color burst 204. Note: A TV tuner may omit the horizontal sync 202 and the color burst 204 from the VBI signal provided to the VBI signal testing program. The horizontal axis represent time, typically in microseconds or nanoseconds, and the vertical axis represents signal strength, typically as a percentage of IRE, a television industry standard measure of signal strength for luma (i.e., brightness). The VBI signal line portion of the displayed signal includes a clock run-in 206, three start bits 208 (the first two low and the third one high), and two 8-bit VBI data fields 210 and 212 (7 bits of ASCII data plus one parity bit). The VBI data line portion shown above is then followed by another horizontal sync 214, which is a lead into the next line of VBI signal data.

Given a VBI signal, a variety of problems might occur, including without limitation:
  (1) Lines of VBI data may be missing
  (2) Too much time-jitter may exist between the horizontal sync 202 and the first VBI data field
  (3) The amplitude of the VBI signal may not comply with the stated VBI standard or varies between scan lines
  (4) There may be less than 5 lead-in samples (i.e., clock run-in samples), which are needed to allow the standard algorithms to detect the VBI
  (5) The end of the signal may be truncated too soon
  (6) The captured line may not be initialized to zero between successive scan lines
  (7) The sampling may be noisy
  (8) The starting time of a sample may not be reported correctly A VBI signal testing program can automatically analyze the raw, digitized VBI signal to determine whether it complies with the published industry standards for VBI signals. Furthermore, a VBI signal testing program can also identify any deviations from the standards to allow diagnostic evaluations of the VBI signals.

Figure 3:
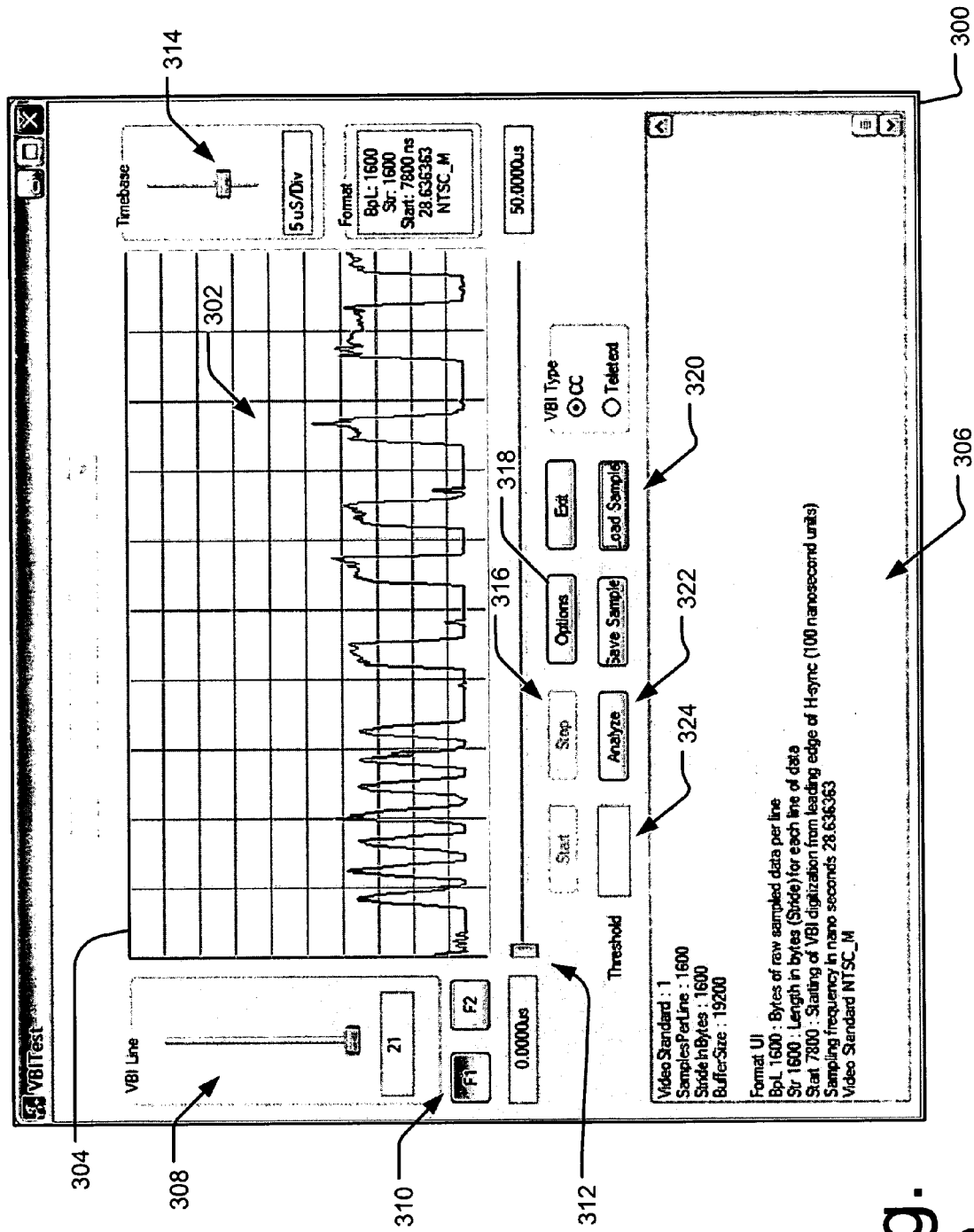
FIG. 3 illustrates an exemplary screenshot of a captured VBI signal as displayed by a VBI signal testing program.

FIG. 3 illustrates an exemplary screenshot 300 of a captured VBI signal 302 as displayed by a VBI signal testing program. The captured VBI signal 302 is displayed in the signal display region 304. The clock run-in, start bits, and several bits of the first VBI data field are visible in the signal display region 304. Header information about the VBI signal is displayed in the scrollable text box 306:

TABLE 2

Example header information for signal in FIG. 3

KS_VBIINFOHEADER
StartLine: 10
EndLine: 21
SamplingFrequency in hertz: 28636363
MinLineStartTime: 454
MaxLineStartTime: 900
ActualLineStartTime: 780
ActualLineEndTime: 5902
VideoStandard: 1
SamplesPerLine: 1600
StrideInBytes: 1600
BufferSize: 19200
Format UI
BpL 1600: Bytes of raw sampled data per line
Str 1600: Length in bytes (Stride) for each line of data
Start 7800: Starting of VBI digitization from leading edge of H-sync (100 nanosecond units)
Sampling frequency in nano seconds 28.636363
Video Standard NTSC_M A VBI line selector 308 allows a user to select a specific line of VBI signal (currently set for line 21). Two switch buttons 310 (i.e., "F1" and "F2") allow a user to select VBI lines of one or the other interlaced frames. A time window slider 312 allows the time window displaying the signal to be moved forward in time (e.g., from 0.0000 μs-50.000 μs to 30.000 μs-80.000 μs). A time base slider 314 allows the time base to be altered (e.g., from 5 μs per division to 500 ns per division).

Start and stop buttons 316 control capture of streaming broadcast TV signals received from a TV tuner. An Option button 318 allows the use to specify a log file to which VBI header information and analysis results can be recorded. Save Sample and Load Sample buttons 320 allow a user to save a VBI signal sample to disk and to load a VBI signal sample from disk.

An analyze button 322 executes an analysis of the captured VBI signal sample relative a published industry standard. After an analysis, a computed threshold is displayed in a threshold text box 324.

Figure 4:
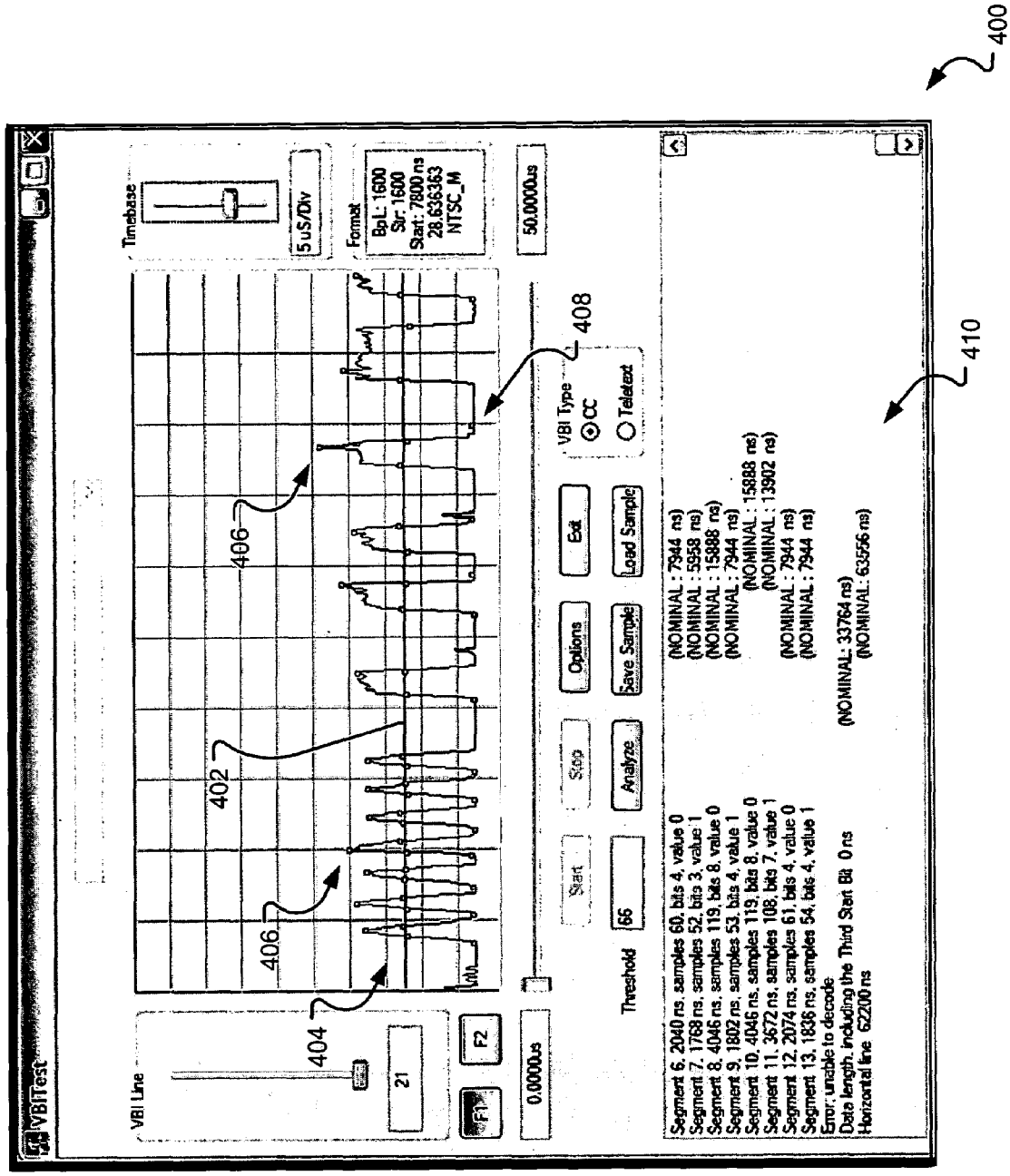
FIG. 4 illustrates exemplary screenshot displaying analysis of a captured VBI signal in a VBI signal testing program.

FIG. 4 illustrates exemplary screenshot 400 displaying analysis of a captured VBI signal in a VBI signal testing program. A threshold 402, individual threshold points 404, maximum points 406, and minimum points 408 have been computed the captured VBI signal and are displayed in the graph as black square boundaries around a white center. See more description on these points in the descriptions of FIGS. 5 and 6.

Analysis results are also displayed in a scrollable window 410 and are listed below for convenience. The analysis is computed for the captured VBI signal (e.g., as discussed with regards to FIGS. 5 and 6) relative to standard characteristics.

TABLE 3

Example analysis results for signal in FIG. 4

CC analyzer
Threshold is 66, current line is 21
16 edge points in sample (should be at least 4)

| | |
|---|---|
| HSync to ClockRunIn length: 11438 ns | (MIN: 10000 ns, NOMINAL: 10500 ns, MAX: 11000 ns) |
| ClockRunIn length: 10574 ns | (NOMINAL: 12910, MAX: 42500) |
| ClockRunIn to ThirdStartBit length: 1020 ns | (NOMINAL: 3972) |
| Samples per bit 15 | |
| Segment 1, 816 ns, samples 24, bits 2, value 1 | (NOMINAL: 3972 ns) |
| Segment 2, 4012 ns, samples 118, bits 8, value 0 | (NOMINAL: 15888 ns) |
| Segment 3, 1734 ns, samples 51, bits 3, value 1 | (NOMINAL: 5958 ns) |
| Segment 4, 4012 ns, samples 118, bits 8, value 0 | (NOMINAL: 15888 ns) |
| Segment 5, 1836 ns, samples 54, bits 4, value 1 | (NOMINAL: 7944 ns) |
| Segment 6, 2040 ns, samples 60, bits 4, value 0 | (NOMINAL: 7944 ns) |
| Segment 7, 1768 ns, samples 52, bits 3, value 1 | (NOMINAL: 5958 ns) |
| Segment 8, 4046 ns, samples 119, bits 8, value 0 | (NOMINAL: 15888 ns) |
| Segment 9, 1802 ns, samples 53, bits 4, value 1 | (NOMINAL: 7944 ns) |
| Segment 10, 4046 ns, samples 119, bits 8, value 0 | (NOMINAL: 15888 ns) |
| Segment 11, 3672 ns, samples 108, bits 7, value 1 | (NOMINAL: 13902 ns) |
| Segment 12, 2074 ns, samples 61, bits 4, value 0 | (NOMINAL: 7944 ns) |
| Segment 13, 1836 ns, samples 54, bits 4, value 1 | (NOMINAL: 7944 ns) |
| Error; unable to decode | |
| Data length, including the Third Start Bit 0 ns | (NOMINAL: 33764 ns) |
| Horizontal line 62200 ns | (NOMINAL: 63556 ns) |

The example analysis results in Table 3 indicate an "Unable to Decode" error. In an implementation associated with these analysis results, an analysis operation examines the VBI signal between the start bits and a zero bit value that follows the CC payload bits in order to determine whether the length and quality of the CC payload complies with the NTSC CC standard. The analysis operation uses the threshold points and other analysis features to count each wave (edge up/edge down) in the CC payload, saving the number of counted waves in a parameter called UNITS. A value representing the maximum number of waves allowed in a CC payload is subtracted from the UNITS parameter. The resulting difference is multiplied by the number of samples per wave in the CC payload. If the resulting product is greater than the length of the payload, then the VBI signal is declared invalid—either the CC payload is too long or contains signal aberration that have been interpreted as excessive CC payload bits.

The analyzed signal in Table 3 was generated from a pre-release TV tuner, which exhibited some signal spikes in the CC payload data. In normal operation, the spikes may have been interpreted as payload bits and therefore resulted in faulty CC payload data (e.g., text). In the analysis, some of the spikes were interpreted as extra payload bits and therefore resulted in a decoding error. In this manner, the analysis can automatically detect problems with VBI signals generated by TV tuners and provide diagnostics to help identify and correct problems with the tuners.

Figure 5:
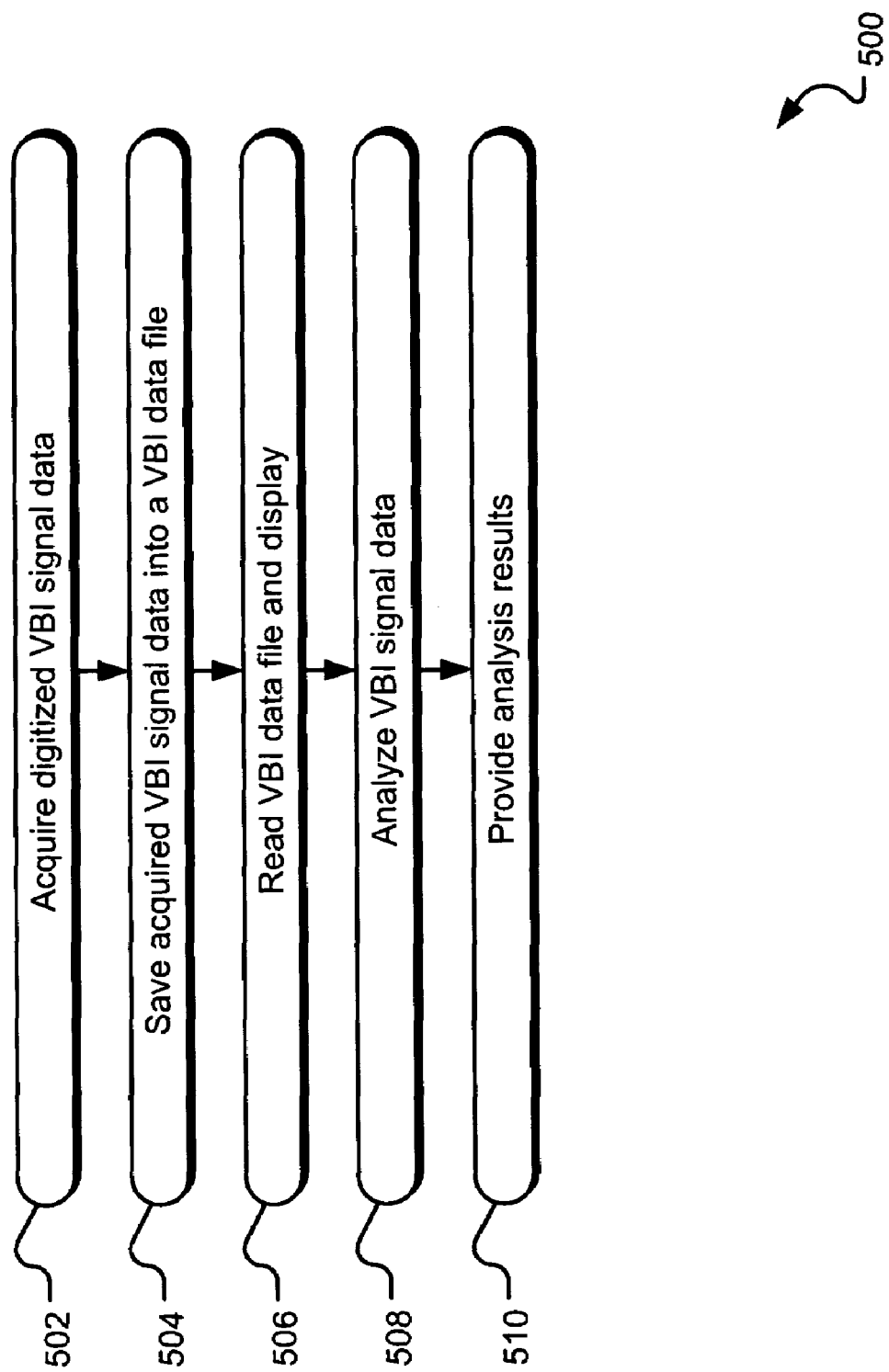
FIG. 5 illustrates exemplary operations for acquiring and analyzing a VBI signal.

FIG. 5 illustrates exemplary operations 500 for acquiring and analyzing a VBI signal. An acquisition operation 502 captures a digitized VBI signal stream from a TV tuner or some other VBI signal source. For example, the acquisition operation 502 may configure a TV tuner for a specified channel, country code, and signal input type (e.g., S-Video, coaxial cable, RCA interface, etc.). Thereafter, in response to detection of a "START" command from a user, the acquisition operation 502 can begin capture of the data stream, and particularly the VBI signal stream, received from the TV tuner.

The VBI signal is received by the computer from the TV tuner in the form of packet data. The acquisition operation 502 first receives a VBI data packet header, followed by the VBI payload, which generally includes a plurality of lines of VBI signal. The VBI data packet indicates the size of the VBI payload, and based on this size information, a acquisition operation 502 computes how much storage the VBI payload requires, allocates the needed space in memory, and copies the VBI payload into the allocated memory space. In one implementation, sixty seconds of VBI signal are recorded in memory, but other durations can be employed. If more VBI signal is received that there is allocated space available, the allocated memory can acts as a first-in, first-out buffer to accommodate additional VBI signal data. Furthermore, the VBI payloads and headers may be stored to persistent memory, such as to a hard disk or in a flash memory.

When the capture is terminated (e.g., by detection of a "STOP" command), the captured VBI signal data in memory (or some portion thereof) can be saved to a VBI data file. Additional data can also be recorded in the VBI data file, including without limitation the VBI data packet header information, the TV tuner name and/or ID, the TV tuner configuration, the current time/data and time zone, user notes, pointers to various segments of the VBI signal data. The VBI data file can be loaded into the VBI testing program at a later point for analysis.

After the VBI signal data is captured (e.g., by loading a file or by capturing from a TV tuner), the currently specified VBI line is read from the VBI data file and displayed on a graph in display operation 506. The horizontal axis represents time, about 50 nanoseconds from start to end of the line of VBI signal data. The vertical axis represents the percentage of strength of the signal. The percentage is relative to IRE units.

An analysis operation 508 analyzes the captured VBI signal (e.g., responsive to an "Analyze" command from the user). The user can select the specific VBI line to analyze by moving the "VBI Line" control on the upper left of the display and select the type of analysis with the "Analyze" radio buttons: "CC" or "Teletext". Other analysis types are also contemplated, including XDS analysis and analysis for other VBI services. The analysis operation 508 is discussed in more detail with regard to FIG. 6. A results operation 510 provides the analysis results (e.g., by display to the user, by printout, by communication to a data file, etc.).

A purpose of an analysis is to detect any deviations from a published industry standard (e.g., EIA/CEA-608-B for NTSC CC and BT.653 for Teletext). For CC analysis, line 21 should be a series of 7 waves (i.e., the clock run-in), followed by 3 start bits, which is followed by two characters of data. The length of each of these segments, the signal strength or magnitude, and other characteristics are defined by the industry standard.

Figure 6:
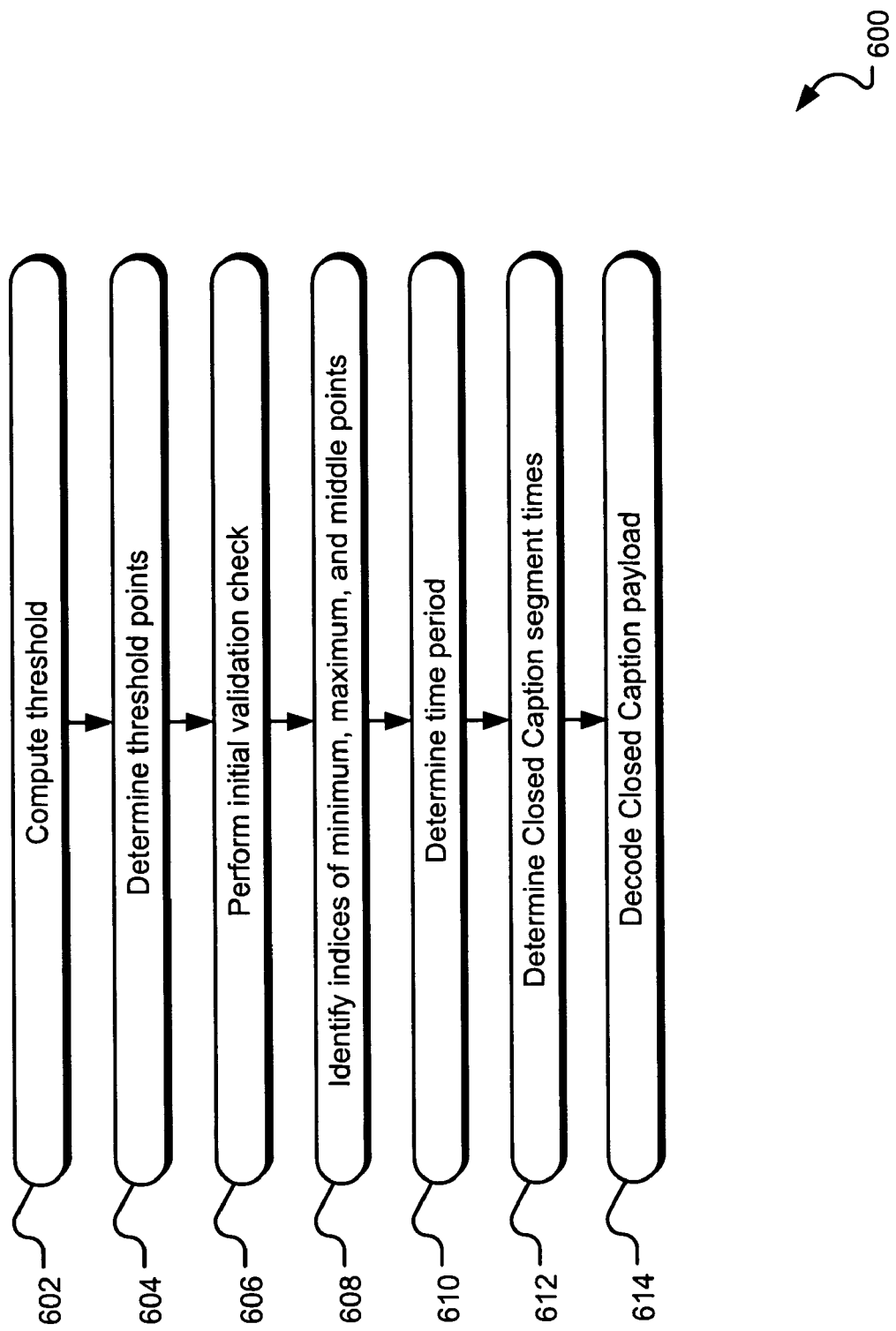
FIG. 6 illustrates exemplary detailed operations for analyzing a VBI signal.

FIG. 6 illustrates exemplary detailed operations 600 for analyzing a VBI signal. A computing operation 602 computes a threshold, which may be static or variable. The computing operation 602 examines the VBI signal and dynamically determines at least one median of the data signal strength. The median is calculated from the highest and lowest data values in a data range. Valid VBI signals include a sequence of waveforms, which start near the Blanking Level (the lower data value), rise towards and crest near 50 IRE (i.e., the highest data value), and then fall toward the Blanking Level again. The VBI signal will tend to increase, cross the median, peak, and then decrease and cross the median again. In one implementation, the median is designated as the threshold of a given segment of VBI signal.

A median-based threshold can be used to test the VBI signal's compliance with an industry standard (e.g., EIA/CEA-608-B or BT.653), which requires that all measurements be made from the median value of the VBI signal. A threshold can also be used to designate portions of the VBI signal as distinct waveforms and to correct the VBI signal in a given segment, if the VBI signal deviates from the standard.

The threshold can be set statically, either via a computation or a predefined value. Alternatively, the threshold may be variable, depending on the characteristics of the captured VBI signal. For example, the threshold may be computed as a median of the high and low data values of the VBI signal (e.g., $(VBI_{max}-VBI_{min})/VBI_{min}$) in the captured VBI signal or in a given segment of the captured VBI segment.

In one implementation, the threshold is computed using a technique of "walking the array" of VBI signal data values along the time axis. The following description describes the technique as applied to a segment of the VBI signal data, but it should be understood that the technique can also be applied to the overall VBI signal. Starting with the first byte of VBI signal data in a segment, the computing operation 602 examines each byte of VBI signal data along the time axis, ending with the last byte of VBI signal data in the segment. Each byte of VBI signal data is associated with an index, wherein the first byte of VBI signal data in a segment has an index of 0, the second bye has an index of 1, etc.

To determine the threshold for a line of captured VBI signal using the "walking the array" technique, the computing operation 602 determines the length of the line from the VBI header—SamplesPerLine. For example, there are 1600 bytes of data in the previously discussed NTSC CC line 21. Minimum and maximum VBI signal data values are initialized to equal the value of the first byte of VBI signal data (i.e., at Index 0). The computing operation 602 then walks through the entire line of data comparing each byte of VBI signal data to the minimum and the maximum values. If a newly encountered byte value of VBI signal data is less than the current value of the minimum, the new value replaces the minimum. If a newly encountered byte value of VBI signal data is more than the current value of the maximum, the new value replaces the maximum. After the entire VBI signal has been traversed, the threshold value is computed using threshold= (max−min)/(2+min), wherein the '2' is added to avoid a possible divide by zero error. It should be understood that other computations of threshold may also be employed. The same technique can be applied to compute thresholds for individual segments of the captured VBI signal.

A points operation 604 uses the computed threshold to determine threshold points on the VBI signal. The threshold points are helpful for discerning which VBI data points form individual waveforms and the shape and characteristics of those waveforms. In this manner, the VBI signal can be validated by the VBI signal testing program. For example NTSC CC should include a sequence of 7 waveforms followed by the three start bits (2 low and 1 high), followed by 2 bytes of CC characters (i.e., 2 8-bit VBI data fields). Furthermore, measurements based on the threshold of the VBI signal or a given segment can be used to compare to the standard characteristics.

In one implementation, the "walking the array" technique is used again, from the start to end of a segment, or the entire captured VBI signal. During the traversal, certain conditions are considered:

If the VBI signal data byte is less than the threshold and the next VBI signal data byte is greater than the threshold, the index of the next VBI signal is marked as "crossing the threshold" with a "rising" characteristic.

If the VBI signal data byte is greater than the threshold and the next VBI signal data byte is less than the threshold, the index of the next VBI signal is marked as "crossing the threshold" with a "falling" characteristic.

If the VBI signal data byte equals the threshold, then the points operation 604 continues walking the array until a first byte of data that is greater or less than the threshold is found. If the next non-threshold VBI signal data byte is greater than the threshold, the index of the next VBI signal is marked as "crossing the threshold" with a "rising" characteristic. If the next non-threshold VBI signal data byte is less than the threshold, the index of the next VBI signal is marked as "crossing the threshold" with a "falling" characteristic. If more than a few sequential VBI signal data byes are equal to the threshold, the points operation 604 may assume that the VBI signal is invalid.

Exemplary threshold points are illustrated in FIG. 4.

Given the threshold points, an initial check operation 606 determines whether the proper number of waveforms exists (for a given type of analysis). For example, a CC line should have 7 waveforms in the clock run in and a Teletext line should have 8 waveforms. Each waveform should have two edges (one rising and one falling). Therefore, the initial check operation 606 should be able to detect at least 14 edges (i.e., threshold points) for CC data and at least 16 edges for Teletext data. If the appropriate condition is not satisfied, an error (e.g., insufficient waveforms for clock run-in) can be logged and the analysis terminated. Too many edges can also indicate an error. For example, an arbitrary limit of 36 edges for CC data has been set for one implementation.

An indexing operation 608 computes the indices of other points, including the minimum, maximum, and middle data values for individual waveforms of the VBI signal. In one implementation, the "walking the array" technique is employed to compute these additional points.

Other parameters can be determined from the VBI packet header, including a time period, which can be used to determine the location of individual expected waveforms within the VBI signal. For example, the H Sync to Start of Clock Run-In characteristic can be determined by a period operation 610 from the ActualLineStartTime field in the VBI packet header and then compared to the requirements of the standard (e.g., acceptable range is between 10.250 μs to 11.000 μs). The period of the signal can be computed from the sampling frequency which can be obtained from the VBI packet header, in hertz. Therefore, the period, in nanoseconds, may be computed by (1/SamplingFrequency)*1000000000. Given the period, the time of any data byte from the beginning of the VBI signal may be determined by period*index. As such, the duration and temporal location of any VBI segment can be computed and compared to the standard. For NTSC CC line 21, the duration of the clock run-in segment should be 12.910 μs, the duration of first two start bits should be 3.972 μs, and the duration of the third start bit should be 1.986 μs. The duration of the VBI data fields, which can represent CC characters, should be 21.778 μs each. Other characteristics may include the rise/fall time of data bit transitions (0.240 μs to 0.288 μs), the clock run-in maximum signal strength (48 IRE to 53 IRE), and the click run-in minimum (0 IRE to 2 IRE).

Now that the waveforms have been distinguished and their locations and widths in time have been computed, the length of each segment can be computed in a segmenting operation 612. The segmenting operation 612 can, therefore, compute the length of the H-Sync to Clock Run-in duration, the length of the clock run-in segment, the length of the start bits segment, and compare these lengths to the standard. For example, the length of the clock run-in segment should be 12.910 μs, as defined by the standard. The results of these comparisons can be provided to the user.

A decoding operation 614, in an NTSC CC analysis, examines the two VBI signal data fields (segments 210 and 212), determines the values of the individual bits of such bytes, checks the parity of such bytes, and determines the ASCII character represented by such bytes. There are two characters that can be present in any single VBI line, including a NUL character to indicate that no character should be displayed to a viewer (e.g., when no one is talking in the video). A similar decoding can be made for Teletext.

In addition to testing VBI signals, the VBI signal testing program can also be used to correct bad VBI signal data. For example, the program can run the VBI signal through a low pass band filter for enhancement. The threshold can be calculated by computing a local threshold for a segment or subsections of the received data and by performing a curve fitting on the resulting thresholds of these segments or subsections to produce a smooth scan line.

The exemplary hardware and operating environment of FIG. 7 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 10. The logical connections depicted in FIG. 7 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

In an exemplary implementation, a VBI signal testing program and other modules may be incorporated as part of the operating system 35, application programs 36, or other program modules 37. VBI signal data points, analysis results and other data may be stored as program data 38.

The technology described herein is implemented as logical operations and/or modules in one or more systems. The logical operations may be implemented (1) as a sequence of processor-implemented steps executing in one or more computer systems and (2) as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of exemplary embodiments of the invention. Since many embodiments of the invention can be made without departing from the spirit and scope of the invention, the invention resides in the claims hereinafter appended. In particular, it should be understand that the described technology may be employed independent of a personal computer. Other embodiments are therefore contemplated.

What is claimed is:

1. A method of testing a vertical blanking interval signal, the method comprising:
   receiving a vertical blanking interval signal derived from at least a portion of a television signal, the vertical blanking interval signal including a plurality of waveforms;
   computing at least one threshold level for the vertical blanking interval signal;
   determining threshold points on the vertical blanking interval signal relative to the at least one threshold level;
   designating portions of the vertical blanking interval signal as distinct waveforms by discerning vertical blanking interval data points forming each waveform according to relative conditions between sequential data points and the threshold level, each waveform comprising at least one threshold point; and
   detecting at least one deviation of the vertical blanking interval signal from a predefined standard based on the at least one threshold point for each waveform.

2. The method of claim 1 wherein the threshold level varies from segment to segment of a line of the vertical blanking interval signal.

3. A method of testing a vertical blanking interval signal, the method comprising:
   receiving a vertical blanking interval signal derived from at least a portion of a television signal, the vertical blanking interval signal including a plurality of waveforms;
   computing at least one threshold level for the vertical blanking interval signal;
   determining at least one threshold point for each waveform relative to the at least one threshold level;
   detecting at least one deviation of the vertical blanking interval signal from a predefined standard based on the at least one threshold point for each waveform; and
   determining at least one other deviation of the vertical blanking interval signal from the predefined standard based on information recorded from a vertical blanking interval packet header for the vertical blanking interval signal.

4. A method of testing a vertical blanking interval signal, the method comprising:
   receiving a vertical blanking interval signal derived from at least a portion of a television signal, the vertical blanking interval signal including a plurality of waveforms;
   computing at least one threshold level for the vertical blanking interval signal;
   determining at least one threshold point for each waveform relative to the at least one threshold level; and
   detecting at least one deviation of the vertical blanking interval signal from a predefined standard based on the at least one threshold point for each waveform,
   wherein the computing operation comprises:
   computing the threshold as a median signal strength of a line of the vertical blanking interval signal.

5. A method of testing a vertical blanking interval signal, the method comprising:
   receiving a vertical blanking interval signal derived from at least a portion of a television signal, the vertical blanking interval signal including a plurality of waveforms;
   computing at least one threshold level for the vertical blanking interval signal;
   determining at least one threshold point for each waveform relative to the at least one threshold level; and
   detecting at least one deviation of the vertical blanking interval signal from a predefined standard based on the at least one threshold point for each waveform,
   wherein the computing operation comprises:
   computing the threshold as a median signal strength of a segment of a line of the vertical blanking interval signal.

6. The method of claim 1 wherein the determining operation comprises:
   determining a threshold point on a rising edge of a waveform based on a crossing of the threshold by the waveform.

7. The method of claim 1 wherein the determining operation comprises:
   determining a threshold point on a falling edge of a waveform based on a crossing of the threshold by the waveform.

8. The method of claim 1 wherein the detecting operation comprises:
   counting a number of edges in a clock run-in segment of a line of a vertical blanking interval signal.

9. The method of claim 8 wherein the detecting operation further comprises:
   detecting a deviation if the number of edges does not comply with a number of edges required by the predefined standard.

10. The method of claim 1 wherein the detecting operation comprises:
    computing a length associated with a segment of a line of the vertical blanking interval signal; and comparing the length against the predefined standard to detect the deviation.

11. A computer-readable medium having computer-executable instructions for performing a computer process that tests a vertical blanking interval signal, the computer process comprising:

receiving a vertical blanking interval signal derived from at least a portion of a television signal, the vertical blanking interval signal including a plurality of waveforms;

computing at least one threshold level for the vertical blanking interval signal;

determining threshold points on the vertical blanking interval signal relative to the at least one threshold level;

designating portions of the vertical blanking interval signal as distinct waveforms by discerning vertical blanking interval data points forming each waveform according to relative conditions between sequential data points and the threshold level, each waveform comprising at least one threshold point; and detecting at least one deviation of the vertical blanking interval signal from a predefined standard based on the at least one threshold point for each waveform.

12. The computer-readable medium of claim 11 wherein the threshold level varies from segment to segment of a line of the vertical blanking interval signal.

13. A computer-readable medium having computer-executable instructions for performing a computer process that tests a vertical blanking interval signal, the computer process comprising:

receiving a vertical blanking interval signal derived from at least a portion of a television signal, the vertical blanking interval signal including a plurality of waveforms;

computing at least one threshold level for the vertical blanking interval signal;

determining at least one threshold point for each waveform relative to the at least one threshold level; and detecting at least one deviation of the vertical blanking interval signal with a predefined standard based on the at least one threshold point for each waveform, wherein the computer process further comprises:

determining at least one other deviation of the vertical blanking interval signal from the predefined standard based on information recorded from a vertical blanking interval packet header for the vertical blanking interval signal.

14. A computer-readable medium having computer-executable instructions for performing a computer process that tests a vertical blanking interval signal, the computer process comprising:

receiving a vertical blanking interval signal derived from at least a portion of a television signal, the vertical blanking interval signal including a plurality of waveforms;

computing at least one threshold level for the vertical blanking interval signal;

determining at least one threshold point for each waveform relative to the at least one threshold level; and detecting at least one deviation of the vertical blanking interval signal with a predefined standard based on the at least one threshold point for each waveform, wherein the computing operation comprises:

computing the threshold as a median signal strength of a line of the vertical blanking interval signal.

15. A computer-readable medium having computer-executable instructions for performing a computer process that tests a vertical blanking interval signal, the computer process comprising:

receiving a vertical blanking interval signal derived from at least a portion of a television signal, the vertical blanking interval signal including a plurality of waveforms;

computing at least one threshold level for the vertical blanking interval signal;

determining at least one threshold point for each waveform relative to the at least one threshold level; and detecting at least one deviation of the vertical blanking interval signal with a predefined standard based on the at least one threshold point for each waveform, wherein the computing operation comprises:

computing the threshold as a median signal strength of a segment of a line of the vertical blanking interval signal.

16. The computer-readable medium of claim 11 wherein the determining operation comprises:

determining a threshold point on a rising edge of a waveform based on a crossing of the threshold by the waveform.

17. The computer-readable medium of claim 11 wherein the determining operation comprises:

determining a threshold point on a falling edge of a waveform based on a crossing of the threshold by the waveform.

18. The computer-readable medium of claim 11 wherein the detecting operation comprises:

counting a number of edges in a clock run-in segment of a line of a vertical blanking interval signal.

19. The computer-readable medium of claim 18 wherein the detecting operation further comprises:

detecting a deviation if the number of edges does not comply with a number of edges required by the predefined standard.

20. The computer-readable medium of claim 11 wherein the detecting operation comprises:

computing a length associated with a segment of a line of the vertical blanking interval signal; and comparing the length against the predefined standard to detect the deviation.

21. The method of claim 1 further comprising:
correcting the vertical blanking interval signal.

22. The method of claim 21 further comprising:
validating the vertical blanking interval signal.

23. The computer-readable medium of claim 11 wherein the computer process further comprises:
correcting the vertical blanking interval signal.

24. The computer-readable medium of claim 23 wherein the computer process further comprises:
validating the vertical blanking interval signal.

* * * * *